United States Patent [19]

Bruck

[11] 3,783,410

[45] Jan. 1, 1974

[54] WAVEBORN EDGE-SHIFTING MODULATION SYSTEM FOR VIDEO RECORDING AND REPRODUCTION

[75] Inventor: George Bruck, Riaz, Switzerland

[73] Assignee: Avco Corporation

[22] Filed: Jan. 7, 1972

[21] Appl. No.: 216,031

[52] U.S. Cl.332/9 R, 179/100.2 K, 179/100.2 MD, 328/58, 332/14, 332/16 R

[51] Int. Cl. .......................... H03k 7/08, G11b 5/06

[58] Field of Search ...................... 332/9 R, 9 T, 14, 332/16 R, 16 T; 328/58; 307/265; 179/100.2 K, 100.2 MD

[56] References Cited

UNITED STATES PATENTS

| | | | |
|---|---|---|---|
| 3,564,160 | 2/1971 | Temes | 179/100.2 K |
| 3,042,754 | 7/1962 | McManis | 179/100.2 MD |
| 3,568,094 | 3/1971 | Metzger | 332/9 R |
| 3,513,266 | 5/1970 | Frost et al. | 179/100.2 MD |
| 3,248,718 | 4/1966 | Uemura | 179/100.2 MD |
| 3,451,012 | 6/1969 | Spiro | 332/16 X |

*Primary Examiner*—Alfred L. Brody
*Attorney*—Harvey W. Mortimer et al.

[57] ABSTRACT

A modulation system for generating a train of substantially rectangular pulses, the trailing edges of alternate pulses being delayed by an amount proportional to a modulating signal and the trailing edges of the remaining pulses being advanced by an amount similarly proportional to the modulating signal, in order to provide an output signal in which the carrier and even order sidebands are suppressed and the odd order sidebands have amplitudes given by the odd order Bessel functions of the first kind with arguments dependent on the index of modulation. Optionally, a carrier signal component can be injected into the output signal in a controlled amount independent of the modulating signal by delaying the leading edges of alternate pulses by a predetermined constant amount and advancing the leading edges of the remaining pulses by the same amount.

12 Claims, 17 Drawing Figures

WAVEBORN EDGE-SHIFTING MODULATION SYSTEM FOR VIDEO RECORDING AND REPRODUCTION

This invention relates to modulation systems, and, more particularly, to modulation systems suitable for use in the magnetic recording and reproducing of wide frequency spectrum signals, such as, for example, television signals.

Various problems are encountered when it is attempted to record wide frequency spectrum signals on a magnetic recording medium such as, for example, magnetic tape. One problem is that, at normal tape speed, the ability of magnetic tape to reproduce high frequencies is limited. Another problem is that, if multiple recording heads are used, slight variations in the electrical characteristics of the recording heads or slight variations in the gaps between the recording heads and the magnetic recording medium may cause spurious amplitude variations which make it difficult and perhaps impossible to accurately reproduce the recorded information.

One technique which has been used to avoid these problems is a form of frequency modulation in which the information signal to be recorded is used to modulate a carrier signal in such a way that the frequency deviation of the modulated signal corresponding to the maximum amplitude of the modulating signal is relatively small as compared with the highest modulating frequency which is, in turn, relatively close to the carrier frequency. This type of frequency modulation (FM) is sometimes referred to as "narrow band" or small-swing FM. Generally, because of the upper frequency limits of magnetic recording media, only the carrier and first lower side band of the narrow band FM signal are recorded on the magnetic recording medium, the upper sidebands being beyond the upper frequency limit of the medium.

One problem of FM in which the carrier is just a little higher than the modulating signal is that, during high frequency excursions of the modulating signal, the second lower sideband of the modulated signal tends to fold over through zero frequency into the portion of the frequency spectrum occupied by the first sideband. In the case of recording and reproducing television signals, even a small amount of this type of interference can be extremely objectionable in that it causes a "moire" effect in the reproduced television image.

Another problem of the prior art narrow band FM modulating systems is that if the amplitude of the carrier frequency component of the modulated signal is large in relation to the sidebands, the power of the output signal from the demodulator will be relatively low.

It is therefore an object of this invention to provide an improved modulation system for the magnetic recording and reproduction of wide frequency spectrum.

Another object of this invention is to provide a modulation system for the magnetic recording and reproduction of television signals which is free of moire interference.

According to the above and other objects, the present invention provides a modulation system and method for producing a modulated signal having a frequency spectrum in which the carrier and even order sidebands are suppressed and the odd order sidebands have amplitude given by the odd order Bessel functions of the first kind with arguments dependent on the index of modulation. The modulated signal resembles a rectangular or square-top wave in which one edge, for example, the trailing edge, of alternate pulses is delayed by an amount proportional to the modulating signal and the trailing edges of the remaining pulses are advanced by an amount similarly proportional to the modulating signal. In a preferred embodiment of the present modulation system, this modulated signal is obtained by a circuit in which the carrier signal is applied in parallel to a frequency doubler and a balanced modulator also supplied with the information signal; the modulated signal is then gated and combined with the doubled carrier signal, and the resulting combined signal is amplified and clipped to provide the modulated output signal.

Optionally, the carrier signal, which is otherwise suppressed in the frequency spectrum of the modulated output signal, can be reinjected in a controlled amount independent of the modulating signal by delaying the leading edges of alternate pulses of the modulated waveform by a predetermined amount and advancing the leading edges of the remaining pulses by an equal amount. This can be accomplished by additionally applying the carrier signal to a 90° phase shifter and level control, and gating and combining the resulting signal with both the doubled and modulated carrier signals prior to the amplification and clipping.

An advantage of the modulation system and method of the present invention is that the modulated waveform carries all its information in its leading and/or trailing edges so that information is not lost by the inherent clipping of magnetic recording media.

Another advantage of the modulation system of the present invention is that the carrier signal may be entirely suppressed, depressed or reinjected in a controlled amount independent of the modulating signal.

Another advantage of the modulation system of the present invention is that it permits the use of a fixed frequency oscillator, such as for example, a crystal oscillator, for generating the carrier signal.

Another advantage of the present invention is that it is compatible with conventional demodulators such as phase discriminators, ratio detectors and correlation detectors.

Still another advantage of the present modulation system is that the modulated signal is rich in harmonics of the carrier frequency. This enables a kind of frequency multiplexing in which modulation takes place at the fundamental carrier frequency and information is transmitted at an harmonic of the carrier frequency.

Other objects and advantages of the present invention will be apparent from the following detailed description and the accompanying drawings which set forth, by way of example, the principle of the present invention and the best mode contemplated for carrying out that principle.

IN THE DRAWINGS

FIG. 1 is a block diagram of a preferred embodiment of modulation system according to the present invention.

FIGS. 2*a* through 2*h* are diagrams of the waveforms at various points in the modulation system of FIG. 1.

Figure 5:
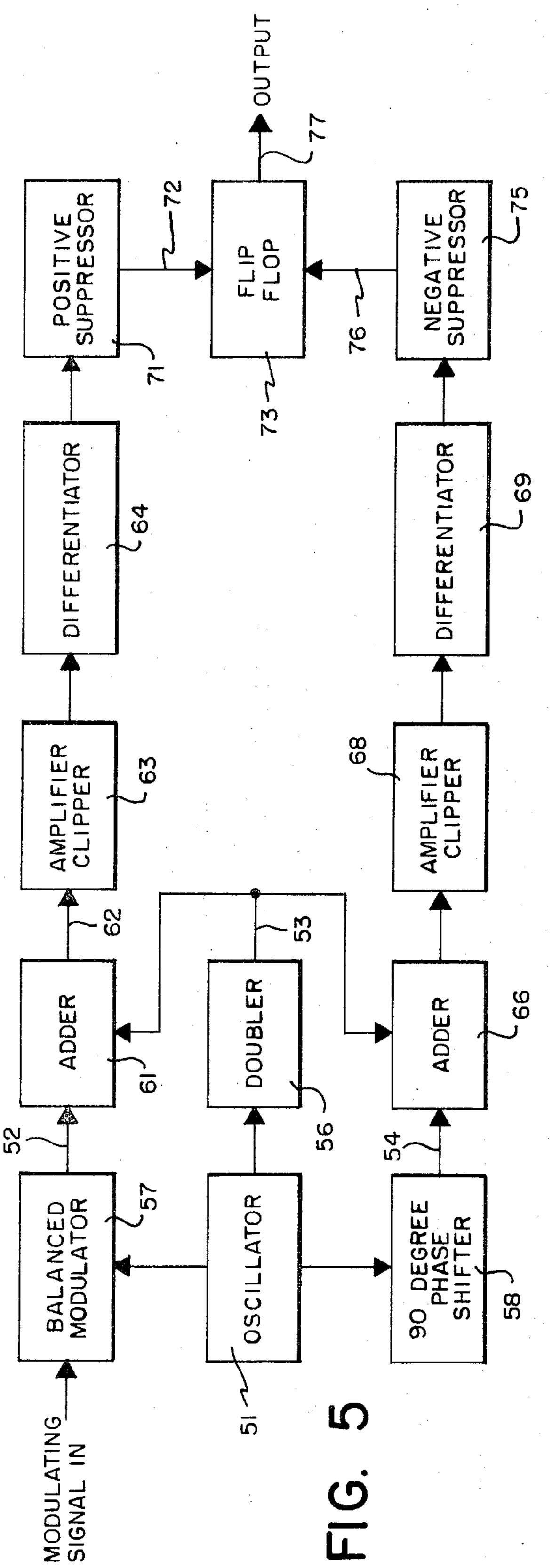
FIG. 5 is a block diagram of an alternate embodiment of modulation system according to the present invention.

FIGS. 6*a* through 6*e* are diagrams of the waveforms at various points in the modulation system of FIG. 5.

Figure 1:
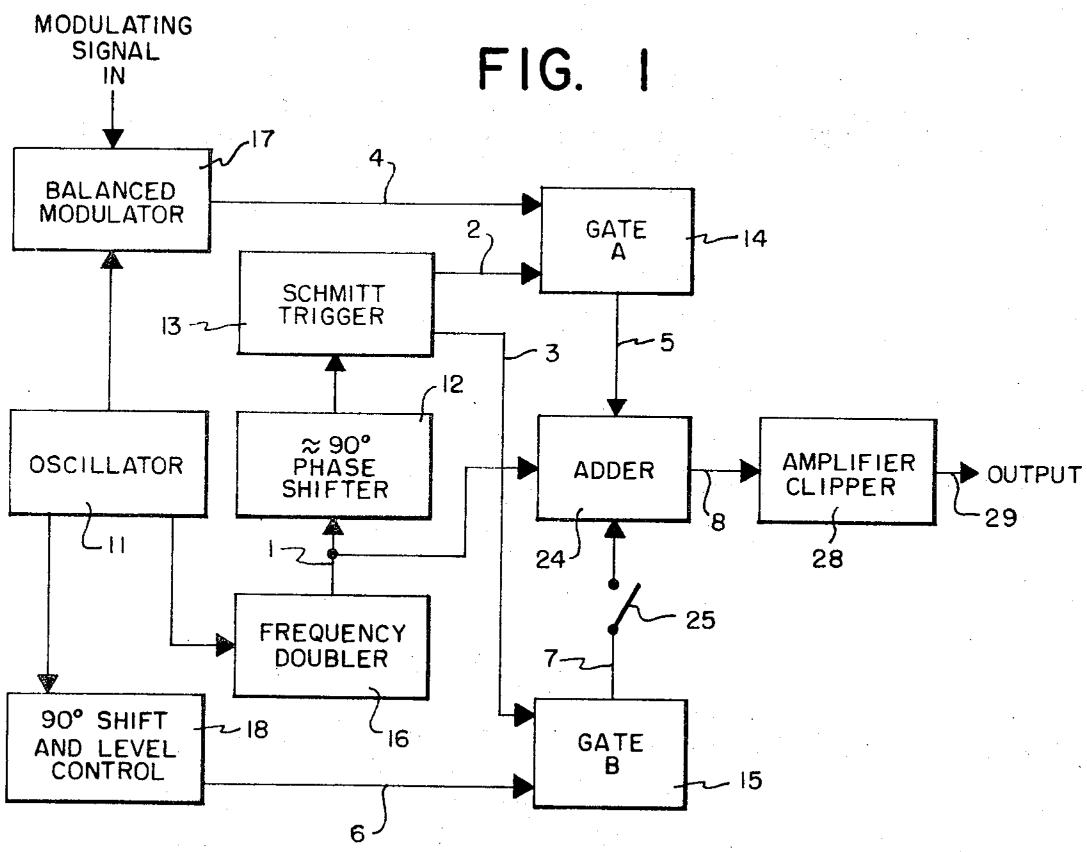

Referring in detail to FIG. 1 of the drawings, there is shown a block diagram of the preferred form of modulation system according to the present invention. The carrier signal, $\omega_c$, is generated by an oscillator 11 which may be a fixed frequency oscillator, such as for example, a crystal oscillator or another appropriate signal source which need not be of the fixed frequency type. The output signal from oscillator 11 is applied to a frequency doubler 16, a balanced modulator 17, and a 90° phase shifter and level control 18. Each of the three elements 16, 17 and 18 may be of a type well-known to those skilled in the art.

Figures 2A, 2B, 2C, 2D, 2E, 2F, 2G, 2H:
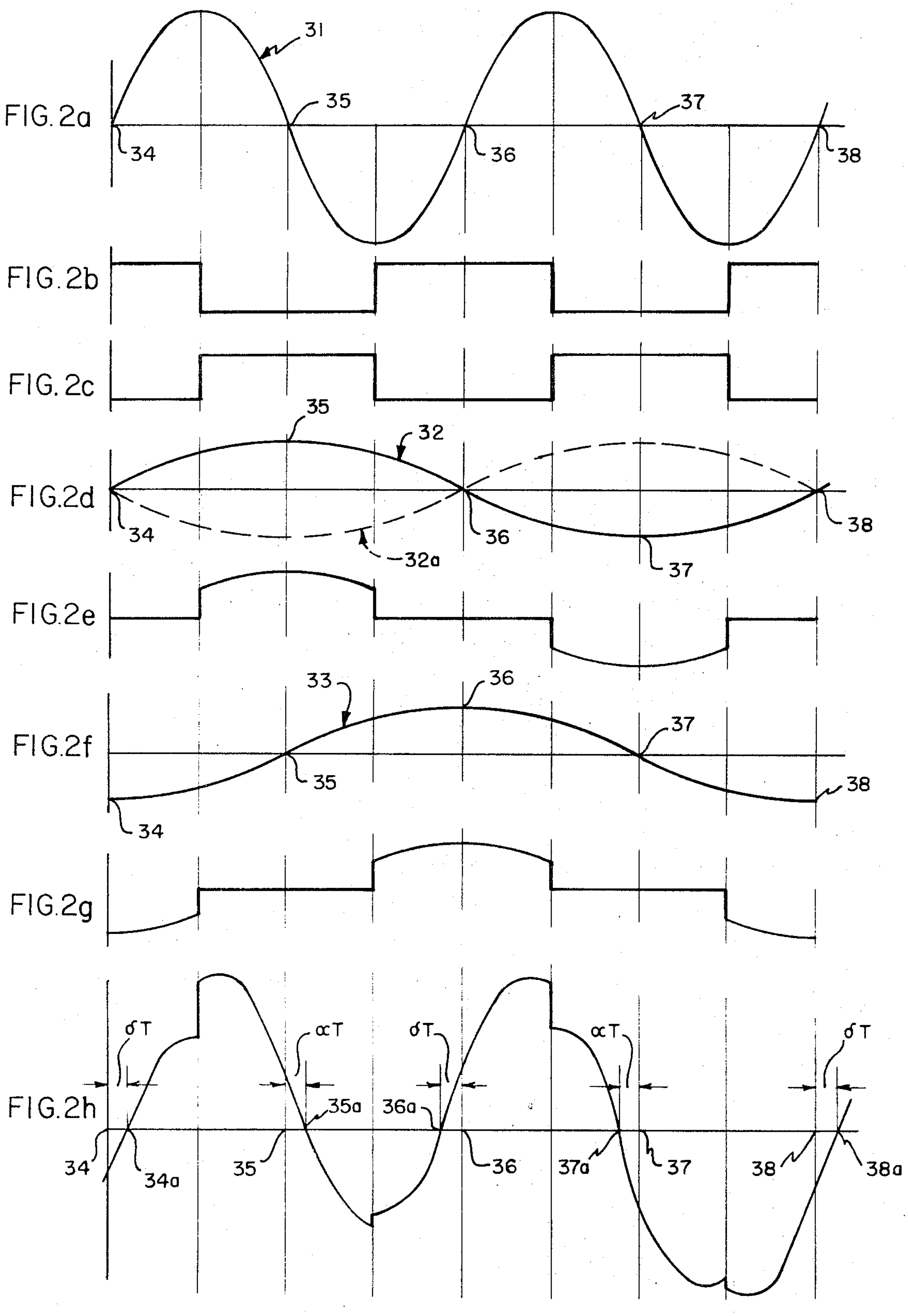

The output signals from frequency doubler 16, balanced modulator 17 and 90° phase shifter and level control 18 are shown in FIGS. 2*a*, 2*d* and 2*f*, respectively. The output signal from frequency doubler 16 which appears on line 1 in FIG. 1, is represented by the sine wave 31 shown in FIG. 2*a*. The frequency of sine wave 31 is twice that of the carrier frequency, $\omega_c$, generated by the oscillator 11 shown in FIG. 1. The amplitude of sine wave 31 is fixed and constant and preferably several times as great as the maximum amplitude of the output signals from balanced modulator 17 and 90° phase shifter and level control 18 of FIG. 1.

The output signal from balanced modulator 17 which appears on line 4 in FIG. 1 is represented by sine wave 32 shown in FIG. 2*d*. The frequency of sine wave 32 is substantially that of the carrier frequency, $\omega_c$, and its amplitude and positive or negative phase is determined by the instantaneous value of the information-carrying signal or modulating signal, $\omega_m$, applied to balanced modulator 17.

The output signal from 90° phase shifter and level control 18 which appears on line 6 in FIG. 1 is represented by cosine wave 33 shown in FIG. 2f. The frequency of cosine wave 33 is simply the carrier frequency, $\omega_c$, and the amplitude of cosine wave 33 is determined by the setting of level control 18 as determined, for example, by a manual control not shown.

The output signal from the frequency doubler 16 is applied to a 90° phase shifter 12 which serves to advance or delay the signal by approximately 90°. As will be understood from the following description, the phase shift introduced by phase shifter 12 need only be approximately 90°, because all of the information in the ultimate output signal on line 29 of FIG. 1 is contained in the axis crossings.

The output from 90° phase shifter 12 is used to operate a Schmitt trigger circuit 13 which switches when the output signal from phase shifter 12 crosses the zero axis. Schmitt trigger 13 has a pair of complementary outputs which are used to operate gates 14 and 15. The Schmitt trigger output signal appearing on line 2 is shown in FIG. 2*b* and the signal appearing on line 3 is shown in FIG. 2*c*. For purposes of illustration it is assumed that a "high" signal on line 2 or 3 will "close" the corresponding gate 14 or 15 and a "low" signal will "open" the corresponding gate. Thus, gates 14 and 15 are alternately operated by Schmitt trigger 13.

The output signal from balanced modulator 17 is applied via line 4 to gate 14 and the resulting output signal which appears on line 5 is illustrated in FIG. 2*e*. The output signal from phase shifter and level control 18 is applied via line 6 to gate 15 and the resulting output signal which appears on line 7 is illustrated in FIG. 2g. It will be seen that the modulated signal on line 4 and the phase shifted signal on line 6 are thus alternately gated by the action of 90° phase shifter 12, Schmitt trigger 13 and gates 14 and 15. It will be appreciated, however, that other switching and gating arrangements can be employed within the spirit and scope of the present invention to achieve the desired alternate gating of the modulated and phase-shifted signals.

The frequency-doubled carrier signal on line 1 and the gated modulated signal on line 5, are applied to adder 24 together with the gated 90° phase shifted signal on line 7. The adder 24 may be of a type well-known to those skilled in the art and serves to algebraically combine the signals applied to its inputs on lines 1, 5 and 7. The output of adder 24 appears on line 8 and is illustrated in FIG. 2h.

A switch 25 may be interposed between gate 15 and adder 24 so that the signal on line 7 can be cut off if desired. Opening the switch 25 has the effect of eliminating the effect of 90° phase shifter and level control 18, thus suppressing the carrier frequency component in the ultimate output signal on line 29. In practice this result would generally be accomplished by eliminating phase shifter 18 and gate 15 from the system entirely.

Assuming that switch 25 is open, only the frequency-doubled carrier signal on line 1 and the modulated signal on line 5 are applied to adder 24 in FIG. 1. Referring to FIG. 2a, it will be seen that the frequency-doubled signal 31 crosses the zero axis at times indicated by points 34, 35, 36, 37 and 38. The modulated signal 32 shown in FIG. 2d also crosses the zero axis at points 34, 36 and 38 regardless of the value of the modulating signal $\omega_m$ applied to modulator 17 in FIG. 2, Hence, it is apparent that the sum of waves 31 and 32 is zero at points 34, 36 and 38. However, because of the positive value of sine wave 32 at the time indicated by point 35, the sum of waves 31 and 32 is not zero at point 35, but rather at point 35*a* shown in FIG. 2*h* which is delayed relative to point 35 by an amount $\alpha$T, where T is the period of the carrier frequency $\omega_c$, and $$\alpha T = \gamma E_m \sin(\omega_m t + \phi)$$

$$10^2 = \beta T/4 \sin(\omega_m t + \phi)$$

where $\gamma$ is a conversion factor (seconds/volt), $E_m$ is the amplitiude of the modulating signal, $\phi$ is an arbitrary phase angle, and $\beta$ is the modulation index which is equal to or less than unity.

Similarly, because of the negative value of wave 32 at point 37, the sum of waves 31 and 32 is not zero at point 37, but at point 37*a* which is advanced relative to point 37 by a similar amount $\alpha T = \beta T/4 \sin(\omega_m t + \phi)$, which will in general have a somewhat different magnitude than the delay of the preceding pulse's trailing edge because $t$ has increased in the interim.

The output signal from adder 24 is applied to amplifier and clipper 28 shown in FIG. 1. In the case where switch 25 is open so that only the frequency-doubled carrier signal 31 shown in FIG. 2*a* and the gated modulated signal shown in FIG. 2*e* are applied to adder 24 and amplifier and clipper 28, the output signal from amplifier and clipper 28 will be of the type illustrated by wave form 41 shown in FIG. 3. The leading edges 44, 46 and 48 of wave form 41 correspond to the zero crossing points 34, 36 and 38 of the waveform 31 in FIG. 2*a*. Trailing edge 45*a* of waveform 41 in FIG. 3 corresponds to point 35*a* which is the zero crossing point of the combined waveforms 31 and 32.

Figure 3:
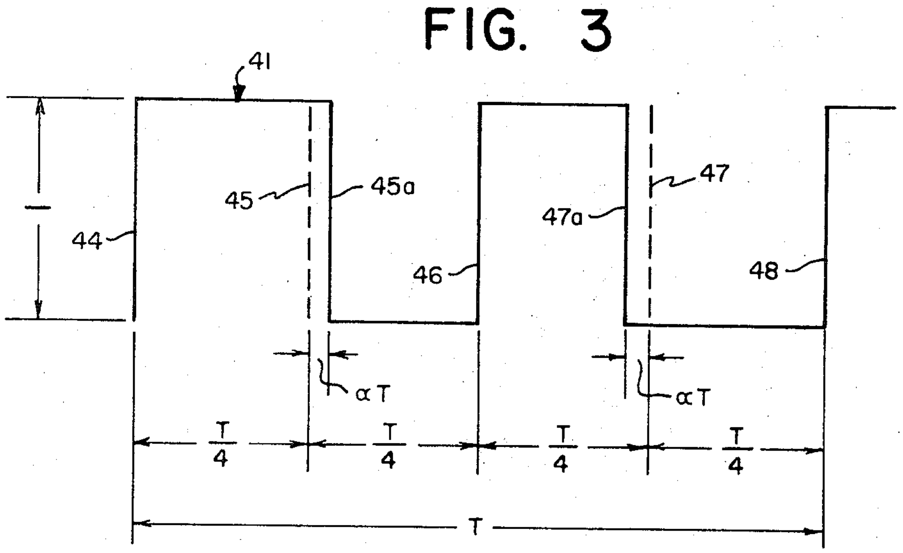
FIG. 3 is a diagram of the output waveform of the modulation system shown in FIG. 1 when operated in the suppressed carrier mode.

Similarly, the trailing edge 47*a* in FIG. 3 corresponds to point 37*a* in FIG. 2*h*. The dashed lines 45 and 47 represent the positions of the trailing edges of the two pulses at an instant when the modulating signal $\omega_m$ and hence the modulated signal 32 shown in FIG. 2 has a value of zero. At such an instant, waveform 41 of FIG. 3 would have the form of a square wave having a period of T/2 and a pulse width of T/4. It will be appreciated that the dashed lines 45 and 47 shown in FIG. 3 correspond to the zero crossing points 35 and 37 of waveform 31 shown in FIG. 2*a*.

It will also be appreciated that if the modulating signal $\omega_m$ is negative at a particular instant, the value of the modulated signal indicated by the dashed waveform 32*a* in FIG. 2*d* would be negative in the neighborhood of point 35 and positive in the neighborhood of point 37. Hence, the zero crossing point of the combined waveforms 31 and 32*a* would be advanced in relation to point 35 and delayed in relation to point 37.

Broadly speaking, therefore, it can be seen that the positions of trailing edges 45*a* and 47*a* of waveform 41 shown in FIG. 3 move around their nominal "zero" positions 45 and 47 in accordance with the instantaneous values of the modulated signal 32 shown in FIG. 2d, which in turn depends upon the instantaneous value of the modulating signal $\omega_m$ which is applied to the balanced modulator 17 in FIG. 1. If trailing edge 45*a* is delayed by an amount $\alpha$T, the adjacent trailing edge 47*a* will be advanced by an approximately equal amount $\alpha$T, and, if trailing edge 45*a* is advanced by $\alpha$T, trailing edge 47*a* will be delayed by approximately $\alpha$T.

Such a modulated wave has the following properties:

1. The carrier frequency $\omega_c$ is suppressed.
2. The first order sidebands ($\omega_c \pm \omega_m$) have amplitudes of $(2/\pi)\ J_1\ (\pi\beta/2)$ and opposite phase relationships, where $J_1$ is a Bessel function of the first kind and first order.
3. The second order sidebands ($\omega_c \pm \omega_m$) are suppressed.
4. The third order sidebands ($\omega_c \pm 3\ \omega_m$) have amplitudes of $(2/\pi)J_3\ (\pi\beta/2)$
5. Generalizing, all even order sidebands ($\omega_c \pm 2k\ \omega_m$) are suppressed, where $k$ is an integer. Further, all odd order sidebands have amplitudes of $$(2/\pi)\ J_{2k-1}\ (\pi\beta/2)$$

where $k$ is an integer and the order of the sideband is $(2k-1)$.

Referring again to FIG. 1, if switch 25 is closed, the phase shifted carrier signal on line 6 will be applied to adder 24 together with the frequency doubled carrier signal on line 1 and the modulated carrier signal on line 22.

Referring to FIG. 2f, it will be seen that waveform 33 which corresponds to the phase shifted carrier signal on line 6 in FIG. 1, crosses the zero axis at points 35 and 37 and thus has little or no effect on the value of the combined signal at these points in time. That is to say, the waveform 33 has little or no effect on the position of the trailing edges 45*a* and 47*a* shown in FIGS. 3 and 4.

On the other hand, waveform 33 has a negative value at point 34, a positive value at point 36 and a negative value at point 38. As a result, the zero crossing points of the combined signal which appears on the output line 8 from adder 24 in FIG. 1, occur at points 34*a* which is delayed by an amount $\delta$T in relation to point 34, point 36*a* which is advanced by an amount $\delta$T in relation to point 36, and point 38*a* which is delayed by an amount $\delta$T in relation to point 38, where $\delta$, the "dislocation factor", is a constant which is determined by the setting of the level control of system element 18.

Figure 4:
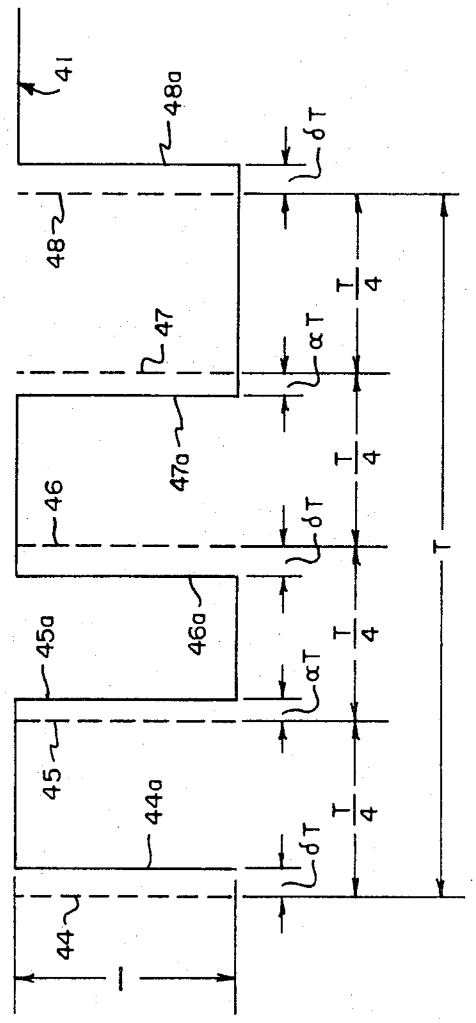
FIG. 4 is a diagram of the output waveform from the modulation system shown in FIG. 1 when operated so that the carrier is reinjected in a controlled amount.

FIG. 4 shows the combined waveform 41 on line 29 after it has been amplified and clipped by the amplifier and clipper 28 shown in FIG. 1. The leading edges 44*a*, 46*a* and 48*a* of the pulses have been dislocated by an amount $\delta$T from their respective zero locations 44, 46 and 48, respectively. More particularly, leading edge 44*a*, which corresponds to point 34*a* in FIG. 2, has been delayed by an amount $\delta$T. Leading edge 46*a*, which corresponds to point 36*a* in FIG. 2, has been advanced by an amount $\delta$T. Leading edge 48*a*, which corresponds to point 38*a* in FIG. 2, has been delayed by an amount $\delta$T.

The waveform 41 shown in FIG. 4 has the same properties as the waveform 41 shown in FIG. 3 except that the leading edge disclocations have the effect of reinjecting a carrier frequency component into the frequency spectrum of the modulated signal which appears at the output of amplifier and clipper 28 in FIG. 1. The amplitude of the carrier frequency component depends upon the size of the leading edge dislocation which in turn depends upon the setting of the level control 18 shown in FIG. 1. More particularly, the carrier frequency component has an amplitude of $2/\pi \sin 2\delta\pi$ which is independent of the sideband amplitudes. In addition, frequency components appearing at even multiples of the carrier frequency ($2\omega_c, 4\omega_c, \ldots$) have amplitudes which are dependent on both the dislocation factor $\delta$ and the index of modulation $\beta$. Further, frequency components are present at all odd multiples of the carrier frequency with an amplitude given in general by $(2/k\pi) \sin 2k\delta\pi$, where $k$ is the multiple of carrier frequency (odd only).

For most practical purposes, the maximum modulation index $\beta$ would be on the order of 0.5 to 0.6. A modulation index $\beta$ of 0.5 will cause the trailing edges of the pulses shown in FIG. 3 to be delayed or advanced by up to 45° or half the width of the pulses shown in FIGS. 3 and 4.

Similarly, the maximum leading edge dislocation that would be desirable for practical purposes would be on the order of 30° or about 0.33 of the width of the pulses shown in FIGS. 3 and 4. Hence, it can be seen that if both maximum modulation and maximum leading edge dislocation are employed, the widths of the pulses shown in FIGS. 3 and 4 may range from less than 20 percent to more than 180 percent of the nominal pulse width T/4.

Because the modulated waveforms 41 shown in FIGS. 3 and 4 are essentially trains of pulses, their frequency spectra will be rich in harmonics of the carrier frequency. These harmonics of the carrier frequency are also modulated with the result that there are sidebands around each carrier harmonic. In general, all even harmonics of the carrier frequency have sidebands with even multiples of the modulating frequency. That is, $2\omega_c$ appears in the frequency spectrum of the modulated waveform 41, as do $2\omega_c \pm 2k\omega_m$, where $k$ is an integer. Likewise, $4\omega_c$ and $4\omega_c \pm 2k\omega_m$, etc., also appear in the frequency spectrum of the output waveform 41.

Further, the sidebands of the odd harmonics of the carrier appear with odd multiples of the modulating frequency, but with even multiples of the modulating frequency suppressed. That is, $3\omega_c \pm (2k-1)$ $_m$ terms appear, where $k$ is an integer.

More particularly, the amplitudes of the various components of the frequency spectrum of the waveforms 41 shown in FIGS. 3 and 4 are as follows:

| Frequency | Amplitude (Fig. 3) | Amplitude (Fig. 4) |
|---|---|---|
| $f_c$ | 0 | $\frac{2}{\pi}\sin 2\delta\pi$ |
| $f_c \pm f_m$ | $\frac{2}{\pi}J_1\left(\frac{\pi\beta}{2}\right)$ | $\frac{2}{\pi}J_1\left(\frac{\pi\beta}{2}\right)$ |
| $f_c \pm 2f_m$ | 0 | 0 |
| $f_c \pm 3f_m$ | $\frac{2}{\pi}J_3\left(\frac{\pi\beta}{2}\right)$ | $\frac{2}{\pi}J_3\left(\frac{\pi\beta}{2}\right)$ |
| $f_c \pm 4f_m$ | 0 | 0 |
| $f_c \pm kf_m$ | 0 for $k$ even<br>$\frac{2}{\pi}J_k\left(\frac{\pi\beta}{2}\right)$ for $k$ odd | 0 for $k$ even<br>$\frac{2}{\pi}J_k\left(\frac{\pi\beta}{2}\right)$ for $k$ odd |
| $2f_c$ | $\frac{1}{\pi}[1+J_0(\pi\beta)]$ | $\frac{1}{\pi}[\cos 4\delta\pi + J_0(\pi\beta)]$ |
| $2f_c \pm f_m$ | 0 | 0 |
| $2f_c \pm 2f_m$ | $\frac{1}{\pi}J_2(\pi\beta)$ | $\frac{1}{\pi}J_2(\pi\beta)$ |
| $2f_c \pm 3f_m$ | 0 | 0 |
| $2f_c \pm 4f_m$ | $\frac{1}{\pi}J_4(\pi\beta)$ | $\frac{1}{\pi}J_4(\pi\beta)$ |
| $2f_c \pm kf_m$ | $\frac{1}{\pi}J_k(\pi\beta)$ for $k$ even<br>0 for $k$ odd | $\frac{1}{\pi}J_k(\pi\beta)$ for $k$ even<br>0 for $k$ odd |
| $3f_c$ | 0 | $\frac{2}{3\pi}\sin 6\delta\pi$ |
| $3f_c \pm f_m$ | $\frac{2}{3\pi}J_1\left(\frac{3\pi\beta}{2}\right)$ | $\frac{2}{3\pi}J_1\left(\frac{3\pi\beta}{2}\right)$ |
| $3f_c \pm 2f_m$ | 0 | 0 |
| $3f_c \pm 3f_m$ | $\frac{2}{3\pi}J_3\left(\frac{3\pi\beta}{2}\right)$ | $\frac{2}{3\pi}J_3\left(\frac{3\pi\beta}{2}\right)$ |
| $3f_c \pm 4f_m$ | 0 | 0 |
| $3f_c \pm kf_m$ | 0 for $k$ even<br>$\frac{2}{3\pi}J_k\left(\frac{3\pi\beta}{2}\right)$ for $k$ odd | 0 for $k$ even<br>$\frac{2}{3\pi}J_k\left(\frac{3\pi\beta}{2}\right)$ for $k$ odd |
| $nf_c \pm kf_m$ | 0 for $n$ odd, $k$ even<br>0 for $n$ even, $k$ odd<br>$\frac{2}{n\pi}J_k\left(\frac{n\pi\beta}{2}\right)$ for $n$ odd and $k$ odd, and for $n$ even and $k$ even and $>0$<br>$\frac{2}{n\pi}\left[1-(-1)^{n/2}J_0\left(\frac{n\pi\beta}{2}\right)\right]$ for $n$ even and $k=0$ | 0 for $n$ odd, $k$ even and $>0$<br>0 for $n$ even, $k$ odd<br>$\frac{2}{n\pi}J_k\left(\frac{n\pi\beta}{2}\right)$ for $n$ odd and $k$ odd, and for $n$ even and $k$ even and $>0$<br>$\frac{2}{n\pi}\sin 2n\delta\pi$ for $n$ odd and $k=0$<br>$\frac{2}{n\pi}\left[\cos 2n\delta\pi-(-1)^{n/2}J_0\left(\frac{n\pi\beta}{2}\right)\right]$ for $n$ even and $k=0$ |

The properties of the modulated waves produced by the modulation system of the present invention are apparent from the above table. The information contained in the carrier frequency component $\omega_c$, if present, and its sidebands is also present in harmonics of the carrier frequency, if present, and the sidebands of the harmonics. The amplitude of the carrier frequency component, $\omega_c$, of the modulated wave shown in FIG. 4 and the odd harmonics of the carrier are adjustable independently of the modulating signal. The amplitudes of the even harmonics of the carrier depend on both the modulating signal and the dislocation factor $\delta$. Further, all sidebands which are present have amplitudes dependent only on the amplitude of the modulating signal. Except for the even harmonics of the carrier, there is thus independent control of the amplitudes of various components of the spectrum by adjustment of the dislocation factor and by adjustment of the amplitude of the modulating signal.

Referring now to FIG. 5 of the drawings, there is shown a block diagram of an alternate embodiment of the modulation system of the present invention. The output from oscillator 51 is applied to a frequency doubler 56, balanced modulator 57 and 90° phase shifter and level control 58. The output signals on lines 52, 53 and 54 are similar to the waveforms 31, 32 and 33 illustrated in FIGS. *2a*, *2d* and *2f*, respectively. The frequency doubled waveform which appears on line 53 at the output of doubler 56 is also shown as waveform 81 in FIG. 6a for reference purposes.

Figures 6A, 6B, 6C, 6D, 6E:
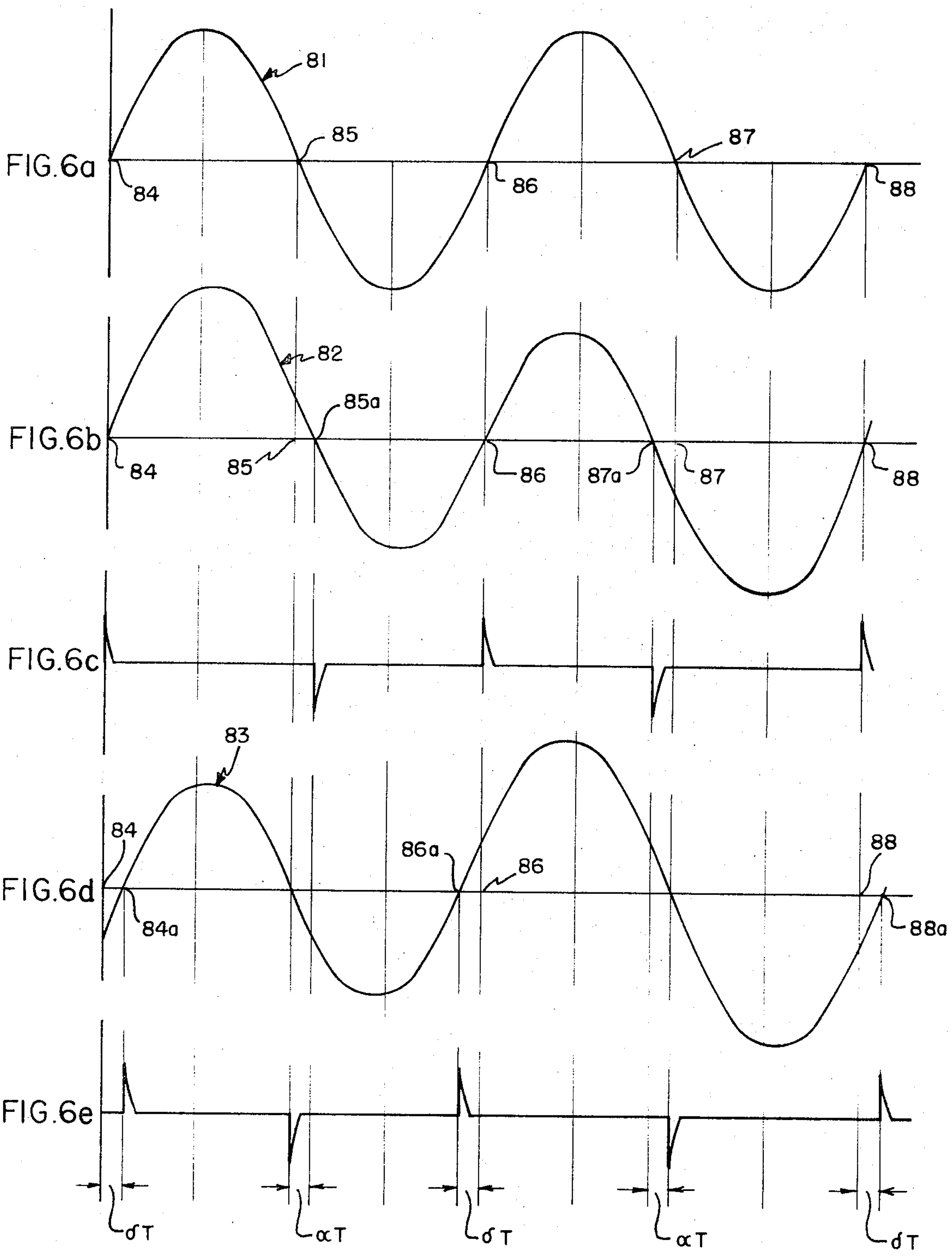

The frequency doubled signal on line 53 and the modulated signal on line 52 are applied to adder 61, the output of which appears on line 62 and is illustrated in FIG. *6b* as waveform 82. The zero crossing points 84, 86 and 88 of waveform 82 occur at the same times as the corresponding zero crossing points of waveform 81 of FIG. *6a*, but the zero crossing point 85*a* is delayed by an amount $\alpha$T and zero-crossing point 87*a* is advanced by a similar amount $\alpha$T. The output from adder 61 is applied to amplifier and clipper 63 and the resulting signal is in turn applied to differentiator 64. The output of differentiator 64 is shown in FIG. 6c.

Similarly, the frequency-doubled signal on line 53 and the 90° phase-shifted signal on line 54 are applied to adder 66 to produce the waveform 83 shown in FIG. *6d*. The zero crossing points 84*a* and 88*a* of waveform 83 are delayed by an amount $\delta$T and zero-crossing point 86*a* is advanced by $\delta$T. The output of adder 66 is processed by amplifier and clipper 68 and differentiator 69 to produce the pulse waveform shown in FIG. 6e.

The positive suppressor 71 passes only negative pulses via line 72 to the flip-flop 73 which is set up so that negative pulses on line 72 cause it to assume a low output value. The negative suppressor 75 passes only positive pulses via line 76 to flip-flop 73. The positive pulses on line 76 cause flip-flop 73 to assume a positive output value. The resulting output signal on line 77 is similar to that produced by the embodiment of FIG. 1 and illustrated in FIG. 4.

While the principles of the present invention have been illustrated by reference to two specific embodiments of the present modulation system, it will be appreciated by those skilled in the art that various modifications and adaptations of the subject modulation system can be made without departing from the spirit and scope of the invention. For example, it will be noted that inversion of the modulated waveform shown in FIGS. 3 and 4 will produce waveforms having the same frequency spectra, but having their "leading" and "trailing" edges interchanged. That is, the modulation $\alpha$T will operate on the leading edges of the pulses and the dislocation $\delta$T will operate on the trailing edges of the pulses without changing any of the other properties of the waveform.

Similar results can be accomplished by removing the 90° phase shifters from the level control branches of the modulation systems shown in FIGS. 1 and 5 and inserting them in the balanced modulator branch of the system. In fact, the desired 90° phase relationship between the modulated signal and phase-shifted signal can be most conveniently accomplished by inserting relatively long delays in both branches of the system and insuring that the difference in delay is 90°.

It will also be apparent to those skilled in the art that apparatus other than the phase shifter and level control 18 shown in FIG. 1 can be used to inject controlled amounts of the carrier frequency into the frequency spectrum of the modulated output signal.

It will also be appreciated that the principles of the present invention contemplate a modulation system in which the modulated signal on line 4 of FIG. 1 and the phase-shifted signal on line 6 are applied directly to adder 24 without benefit of gating.

It will also be understood by those skilled in the art that other modifications and adaptations of the present modulation system may be made within the spirit and scope of the present invention as defined with particularity in the appended claims.

What is claimed is:

1. Apparatus for modulating a carrier signal by a modulating signal, comprising:

means for modulating said carrier signal in accordance with said modulating signal to provide a modulated carrier signal;

means for doubling the frequency of said carrier signal to provide a frequency-doubled carrier signal;

means for combining said modulated carrier signal and said frequency-doubled carrier signal to provide a combined signal; and means for amplifying and clipping said combined signal so as to provide a train of substantially rectangular pulses, one edge of alternate ones of said pulses being delayed by an amount proportional to said modulating signal and the corresponding edge of the remaining pulses being advanced by an amount similarly proportional to said modulating signal.

2. The modulating apparatus of claim 1, wherein said modulating means comprises a balanced modulator.

3. The modulating apparatus of claim 2, wherein said combining means comprises an adder for adding the modulated carrier signal and the frequency-doubled carrier signal.

4. Apparatus for modulating a carrier signal by a modulating signal, comprising:

means for modulating said carrier signal in accordance with said modulating signal to provide a modulated carrier signal;

means for doubling the frequency of said carrier signal to provide a frequency-doubled carrier signal;
means for providing a phase-shifted carrier signal having a 90° phase relationship to said modulated carrier signal;
means for adjusting the level of said phase-shifted carrier signal to a predetermined value;
means for combining said modulated carrier signal, said frequency-doubled carrier signal and said phase-shifted carrier signal so as to provide a combined signal; and
means for amplifying and clipping said combined signal so as to provide a train of substantially rectangular pulses, each of said rectangular pulses having a first edge and a second edge, the first edges of alternate ones of said pulses being delayed by an amount corresponding to said modulating signal and the first edges of the intervening pulses being advanced by an amount similarly corresponding to said modulating signal, and the second edges of alternate ones of said pulses being delayed by an amount corresponding to said predetermined level value of said phase-shifted carrier signal and the second edges of intervening pulses being advanced by an amount similarly proportional to said predetermined level value of said phase-shifted carrier signal.

5. The modulating apparatus of claim 4, wherein said modulating means comprises a balanced modulator.

6. The modulating apparatus of claim 5, wherein said combining means comprises an adder for adding the modulated carrier signal, the phase-shifted carrier signal and the frequency-doubled carrier signal.

7. The modulating apparatus of claim 6, further comprising means for alternately gating the modulating carrier signal and the phase-shifted carrier signal to said adder.

8. A modulation system comprising:
an oscillator for generating a carrier signal;
a modulator connected to said oscillator for modulating said carrier signal in accordance with a modulating signal;
a frequency-doubler connected to said oscillator for providing a signal having a frequency twice that of the carrrier signal;
an adder connected to said modulator and said frequency-doubler for combining the modulated output of said modulator with said doubled carrier frequency;
means responsive to the output signal from said adder to provide a train of substantially rectangular output pulses, one edge of alternate ones of said pulses being delayed by an amount proportional to said modulating signal and the corresponding edge of the remaining pulses being advanced by an amount similarly proportional to said modulating signal.

9. The modulation system of claim 8, wherein said modulating means comprises a balanced modulator.

10. The modulation system of claim 9, wherein said means responsive to the output signal from said adder comprises:
a bistable circuit; and
means responsive to the output signal from said adder for switching said bistable circuit to a first state.

11. The modulation system of claim 10, further comprising:
phase-shifter means connected to said oscillator for providing a phase-shifted carrier signal having a 90° phase relationship to said carrier signal;
means for adjusting the level of said phase-shifted carrier signal to a predetermined value;
a second adder for adding the phase shifted carrier signal and the frequency doubled carrier signal; and
means responsive to the output signal from said second adder for switching said bistable circuit to a second state, whereby the second edge of alternate ones of the rectangular output pulses from said bistable circuit is delayed by an amount proportional to the level of said phase-shifted carrier signal, and the second edge of adjacent pulses being advanced by an amount similarly proportional to the level of said phase-shifted carrier signal.

12. Apparatus for modulating a carrier signal by a modulating signal, comprising:
means for modulating said carrier signal in accordance with said modulating signal to provide a modulated carrier signal, said modulated carrier signal being phase-shifted by an amount proportional to the amplitude of said modulating signal;
a frequency doubler for extracting the second harmonic of said carrier signal;
means for combining said modulated carrier signal and said second harmonic of said carrier signal to provide a train of waveforms, one edge of alternate ones of said waveforms being delayed by an amount proportional to said modulating signal and the corresponding edge of the remaining waveforms being advanced by an amount similarly proportional to said modulating signal.

* * * * *